(No Model.)
G. C. HUTTEMEYER.
PROCESS OF MANUFACTURING A CONFECTION TO CONTAIN MEDICINE.
No. 352,466. Patented Nov. 9, 1886.
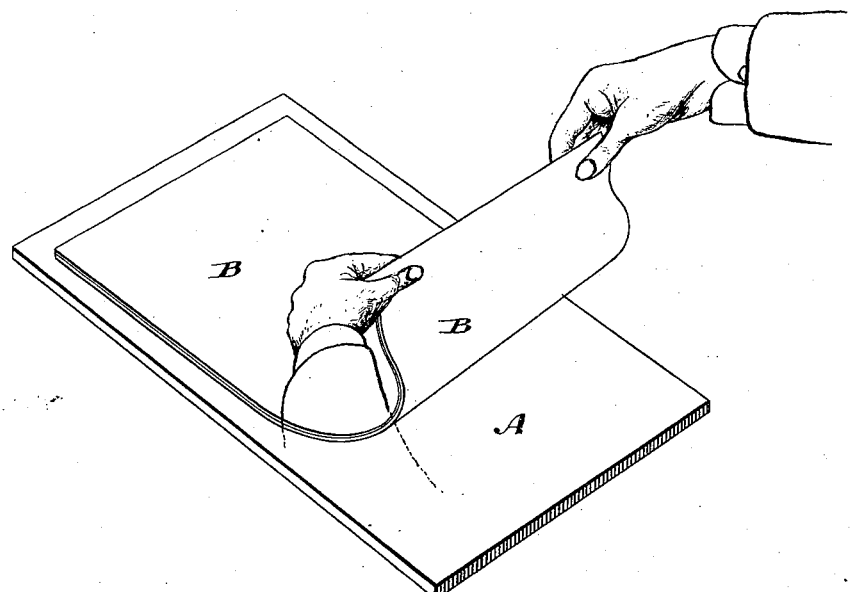
Fig. 1.
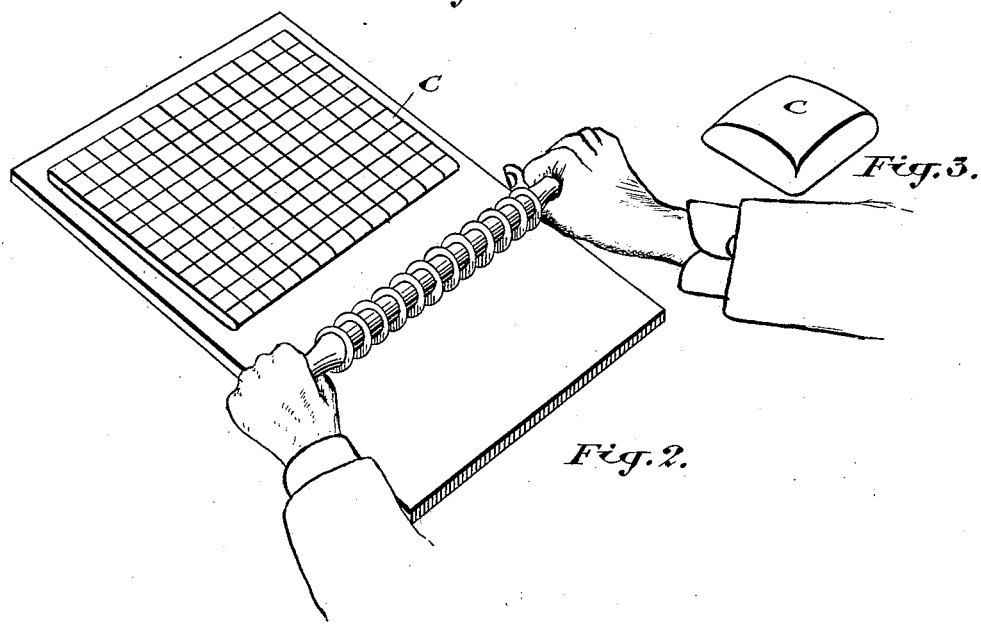
Fig. 2.
Fig. 3.
Witnesses.
F. B. Fetherstonhaugh
Chas H. Riches
Inventor:
G. C. Huttemeyer
by Donald C. Ridout & Co
Attys

UNITED STATES PATENT OFFICE.

GEORGE CHRISTOPHER HUTTEMEYER, OF TORONTO, ONTARIO, CANADA, ASSIGNOR OF ONE-HALF TO FRANCIS PORTER TERRY, OF BATAVIA, N. Y.

PROCESS OF MANUFACTURING A CONFECTION TO CONTAIN MEDICINE.

SPECIFICATION forming part of Letters Patent No. 352,466, dated November 9, 1886.

Application filed April 22, 1886. Serial No. 199,802. (No specimens.) Patented in Canada May 5, 1886, No. 23,976.

*To all whom it may concern:*

Be it known that I, GEORGE CHRISTOPHER HUTTEMEYER, a citizen of the United States of America, of the city, county, and State of New York, now residing in the city of Toronto, in the county of York, in the Province of Ontario, Canada, confectioner, have invented a new and useful process for the manufacture of a confection to contain a substance held independent of the material composing the confection, of which the following is a specification.

The object of the invention is to devise a process for the manufacture of a confection to contain a substance held independent of the material composing the confection; and it consists, essentially, in preparing a paste of confection, which is spread in the form of a sheet, and while yet warm has spread upon its surface the substance that the confection is intended to conceal, the sheet thus coated being doubled over, so as to bring the two halves of its coated surface together, and the doubled sheet is then cut into small tablets, preferably the shape of caramels, and preferably by means of the ordinary caramel-cutters, substantially as hereinafter more particularly explained.

Figure 1 represents a marble slab with a sheet of my coated confection in the act of being folded over. Fig. 2 represents the sheet of confection as it will appear when cut up into small tablets. Fig. 3 represents the completed confection.

By the adoption of my invention cod-liver oil, castor-oil, disagreeable-tasting powders, and, in fact, substantially all substances to be taken internally, may be concealed and administered practically without the knowledge of the patient.

In preparing my confection I take the following ingredients and compound them substantially in the proportions given—that is to say, to about ten pounds of sugar I add one ounce of paraffine, a little less than an eighth of an ounce of cream of tartar, and about three pints of water, which I mix and submit to a heat of about 320° to 340° Fahrenheit. I pour this liquid onto the slab A, and it quickly solidifies to form a paste-sheet, B. The top surface of this I rapidly coat with the substance I intend to conceal, and before it has become cool turn it quickly over, so as to bring the two halves of the coated surface together. I then, while the sheet is still warm, cut it up into small tablets C. The cutting of the sheet seals the edges of each of the small tablets C, so that the substance contained within them cannot possibly escape. The paraffine causes a smooth surface to be formed around each tablet C, and the substance will not penetrate through the confection thus prepared.

Instead of folding the sheet together, as described, the same effect, of course, will be produced by making separate sheets and bringing their coated surfaces together in the same manner.

What I claim as my invention is—

1. The within-described process for the manufacture of a confection containing a substance held independent of the material composing the confection, the said process consisting in spreading the substance to be concealed upon a warm sheet of confection, folding the covered surface together, and cutting the sheet into tablets, so that the edge of each tablet shall be sealed by the cutter.

2. The within-described process for the preparation of a confection and containing a substance held independent of the material composing the confection, the said process consisting in boiling sugar, paraffine, cream of tartar, and water, substantially in the proportions specified, to a heat of about 320° to 340° Fahrenheit, spreading the compound thus prepared into a sheet, the surface of which is coated with the substance to be concealed, folded together and cut into small tablets, substantially in the manner and for the purpose hereinbefore described.

3. As a product of the within-described process, the tablets C, consisting of three layers, two of confection and one of medicament, the latter adherent to the layers of confection and concealed by the same, substantially as described.

4. The tablet C, comprising a shell or coating consisting, essentially, of sugar, paraffine, and cream of tartar, in the proportions specified, and an independent filling of medicament, substantially as described, and for the purpose specified.

Toronto, April 15, 1886.

GEORGE CHRISTOPHER HUTTEMEYER.

In presence of—
CHARLES C. BALDWIN,
CHAS. H. RICHE.